United States Patent [19]

Cobb

[11] 4,258,150

[45] Mar. 24, 1981

[54] ALKENYLATION OF MONOVINYL AROMATIC POLYMERS

[75] Inventor: Raymond L. Cobb, Bartlesville, Okla.

[73] Assignee: Phillips Petroleum Company, Bartlesville, Okla.

[21] Appl. No.: 58,984

[22] Filed: Jul. 20, 1979

[51] Int. Cl.$^3$ ............................................. C08F 8/02
[52] U.S. Cl. ................................... 525/316; 260/42; 260/42.15; 260/42.16; 260/42.32; 526/173; 526/180; 525/313; 525/356; 525/359; 525/362; 525/371
[58] Field of Search ................ 526/173; 525/313, 316

[56] References Cited

U.S. PATENT DOCUMENTS

| | | | |
|---|---|---|---|
| 3,231,635 | 1/1966 | Holden et al. | 526/173 |
| 3,287,333 | 11/1966 | Zelinski | 526/173 |
| 3,459,832 | 8/1969 | Kern | 526/173 |
| 3,492,369 | 1/1970 | Naylor | 260/879 |
| 3,534,012 | 10/1970 | Dennis | 526/173 |
| 3,817,967 | 6/1974 | Mace et al. | 260/880 B |
| 3,847,834 | 11/1974 | Dennis | 526/173 |

OTHER PUBLICATIONS

"Metalation of Polystyrene," Morton et al., J. Org. Chem. 24,-1167-1169, (1959).

*Primary Examiner*—William F. Hamrock

[57] ABSTRACT

Monovinyl aromatic polymers are modified by reacting with elemental alkali metal and a conjugated diene to produce polymers having branches containing olefinic unsaturation. The olefinically unsaturated branches provide reactive sites which are readily reacted with various substances to obtain numerous variations in the properties of the monovinyl aromatic polymers.

19 Claims, No Drawings

ALKENYLATION OF MONOVINYL AROMATIC POLYMERS

This invention relates to a new method useful for modifying the properties of monovinyl aromatic polymers.

Monovinyl aromatic polymers, such as polystyrene and styrenebutadiene copolymers, have found many applications in contemporary polymer technology. While the numerous types of monovinyl aromatic polymers allow some selection in properties, it has been recognized that it would be desirable to be able to modify the properties of the available polymers by simple known chemical reactions. Unfortunately, the absence of olefinic unsaturation in the monovinyl aromatic portion of the polymers limits the extent to which the polymers can be modified chemically without causing serious degradation of desired properties.

One prior art method of chemically modifying the properties of monovinyl aromatic polymers has involved activating the polymers by bulk kneading of the polymers with an elemental alkali metal and then contacting the activated polymers with compounds which would react at the activated sites. See U.S. Pat. No. 3,817,967 which issued June 18, 1974.

The technique is of limited utility in that the reactive nature of the activated polymer generally would preclude consumers from storing the activated polymer for some later reaction with selected reactants. A further limitation of that technique is that the reaction of the modifiers with the activated polymer is also carried out by bulk kneading.

An object of the present invention is to provide a new method for modifying the properties of monovinyl aromatic polymers.

Another object of the present invention is to provide a new method for producing an alkenylated monovinyl aromatic polymer which can be stored for relatively long periods and still remain easily modified by well-known olefin addition reactions.

Yet another object of the present invention is to provide a new method for producing a monovinyl aromatic polymer containing a plurality of alkenyl branches along the polymer backbone.

Other aspects, objects, and advantages of the present invention will be apparent from the following disclosure and the appended claims.

In accordance with the present invention monovinyl aromatic polymers are activated by mixing the polymer with elemental alkali metal in the presence of a suitable solvent under conditions suitable to produce a solution of alkali metal activated polymer and reacting the solution of alkali metal activated polymer with at least one conjugated diolefin under conditions such as to produce a monovinyl aromatic-containing polymer containing a plurality of alkenyl-containing branches along the polymer backbone.

Further in accordance with the present invention the alkenylated monovinyl aromatic containing polymer is subjected to an olefin addition reaction using reactants necessary to give the polymer the desired characterics.

The instant invention is applicable to any monovinyl aromatic polymers that do not contain substituents that preclude the described activation. Examples of suitable monovinyl aromatic polymers include homopolymers and copolymers of monovinyl aromatic compounds, and copolymers of monovinyl aromatic compounds and conjugated dienes. Exemplary monovinyl aromatic compounds suitable for making such polymers include styrene, vinyltoluene, p-t-butylstyrene, vinylnaphthalene, vinylpyridine, and the like. Conjugated dienes used in preparing such polymers generally have from 4 to 10 carbon atoms per molecule and include butadiene, isoprene, piperylene, 2,4-octadiene, 1,3-decadiene and the like.

The present invention is particularly applicable to molding grade monovinyl aromatic polymers. Such molding grade polymers generaly have a Staudinger average molecular weight of about 40,000–100,000.

The elemental alkali metals used in this invention include lithium, sodium, and potassium alone or in combination, in any desired proportion. Combinations of the alkali metals in the form of alloys are suitable. It is presently preferred to employ alloys of sodium and potassium, many of which are currently readily available commercially. A particularly preferred alloy is the one having a weight ratio of sodium to potassium of about 22/78. That alloy is very convenient to handle since it is normally liquid at room temperature.

The solvent should be one which is substantially inert under the reaction conditions. Accordingly, the presence of hydrocarbon having benzylic hydrogens is to be minimized, and preferably excluded. Examples of suitable solvents include benzene, cyclohexane, t-butylbenzene, and the like. Generally the solvent will be employed in an amount of from about 1 to about 20 parts by weight per part by weight of the monovinyl aromatic polymer. It is presently preferred to employ about 1 to about 5 parts by weight of solvent per part by weight of the monovinyl aromatic polymers.

It is frequently desirable to include in the reaction mixture a finely divided solid material which serves as a dispersant or support for the alkali metal treating agent. Exemplary solid material include silica clays, diatomaceous earth, graphite, sodium carbonate, sodium sulfate, etc. When a finely divided solid is so employed, it is generally employed in amounts ranging from about 2 to about 20 parts by weight per part by weight of the elemental alkali metal. It is currently preferred to employ from about 5 to about 10 parts by weight of such solid per part by weight of the elemental alkali metal.

The amount of elemental alkali metal employed can vary over a wide range depending on the amount of reactive sites desired in the activated polymer. Generally, the elemental alkali metal is employed in an amount in the range of about 0.01 to about 10 parts by weight of elemental alkali metal per 100 parts by weight of polymer, preferably about 0.5 to about 5 parts by weight of alkali metal treating agent per 100 parts by weight of polymer.

The alkali metal and the polymer solution are reacted by agitating the reaction mixture in any suitable manner.

Any suitable conjugated diene can be employed in the alkenylation. Preferably, the conjugated dienes are hydrocarbons containing four to eight carbon atoms per molecule. Exemplary conjugated dienes include 1,3-butadiene, isoprene, 1,3-hexadiene, 2,4-octadiene, and the like.

The amount of conjugated diene employed in the alkenylation of the activated monovinyl aromatic polymers is generally dependent upon the desired result. When it is desired to maximize the number of monovinyl aromatic units that are modified and minimize polymerization of the conjugated diene reactants, it is considered desirable to employ a maximum of about 1 mole of conjugated diene per mole of monovinyl aromatic units in the polymer. Accordingly, the molar ratio of conjugated diene to monovinyl aromatic units in the polymer will preferably be in the range of about 0.05 to about 1.0. More preferably that molar ratio is in the range of about 0.5 to about 1.0.

In order to avoid anionic homopolymerization of the conjugated diene which would result in homopolymerization of the conjugated diene rather than maximizing the number of modified monovinyl aromatic units, the alkali metal and the polymer are brought into contact in the diluent before the conjugated diene is added to the reaction vessel.

To further limit the undesirable polymerization of the conjugated diolefin it is desirable to include in the reaction mixture a polymerization inhibiting amount of a tertiary amine containing 3 to 10 carbon atoms per molecule. Exemplary tertiary amines include trimethylamine, triethylamine, tetramethylethylenediamine, N,N-diethylaniline, and the like. Generally, about 1 to about 10 parts by weight of the tertiary amine per 100 parts by weight of the monovinyl aromatic polymer is suitable.

The inventive process can be carried out under any suitable reaction temperature. Generally, the process is carried out at temperatures in the range of about 25° C. to about 200° C., preferably about 70° C. to about 150° C. It is generally desirable to maintain sufficient pressure (e.g. atmospheric or greater) to maintain the diluent in the liquid phase. The reaction mixture is subjected to agitation to insure adequate contacting of the reactants.

The conjugated diene can be added as a liquid or, if desired, can be bubbled into the liquid phase as a gas. It is desirable to add the conjugated diene to the reaction mixture slowly in such a fashion as to avoid localized concentration of the conjugated diene which could result in graft polymerization, i.e. formation of polymeric branches to the exclusion of mono-molecular branches.

The resultant alkenylated monovinyl aromatic polymer can be isolated by any of the currently used methods for recovering polymers. For example, the reaction mixture can be concentrated by flashing and filtered to remove solid materials, washed to remove reactant and tertiary amine residues. Alternatively a solution of the polymer can be precipitated by the addition of a nonsolvent. The recovered polymer can then be further washed and dried as desired, i.e. under vacuum at elevated temperatures.

The thus-recovered alkenylated monovinyl aromatic polymer can then when desired be modified by subjecting the alkenyl groups to any one of a number of well-known olefin addition reactions. Examples of such reactions include halogenation, hydrohalogenation, epoxidation, oxidation, hydrogenation, hydroboration, sulfonation, thiolation, and the like. The resultant derivatized alkenylated monovinyl aromatic polymers can then be employed in a wide variety of applications wherein the particular properties imparted to the polymer by the derivatization are desired. For example bromination can produce monovinyl aromatic polymers having very significant weight percentages of bromine. Such polymers are generally much more suitable than unmodified polymers for applications where flame resistance is important.

Generally, the olefin addition reactions are carried out on the alkenyl groups with the polymer in a suitable solvent. Suitable reaction conditions can readily be determined by those having routine skill in the art.

EXAMPLE I

The following run illustrates the butenylation of polystyrene.

To a stirred reactor containing polystyrene (150 grams), sodium carbonate (42 grams), benzene (300 ml), sodium/potassium alloy containing 22/78 weight ratio of sodium/potassium (5.1 grams), and tetramethylethylenediamine (10 ml) maintained at 135° C. with constant stirring was added liquid 1,3-butadiene at a rate of 1 ml/minute. Rapid exothermic reaction resulted in which the temperature increased to 190° C. After addition of 97 grams butadiene, a dark, viscous product remained which was diluted with benzene and filtered through a bed of diatomaceous earth and subsequently flashed to remove volatiles. The viscous residue was dissolved in benzene then poured slowly into rapidly stirred methanol. The precipitated residue was removed by filtration and washed with methanol. Drying under vacuum at 45° C. resulted in 157 grams total product.

Proton NMR indicated that the recovered product was approximately 50% butenylated (based on total styrene units in the polystyrene). The elemental composition calculated for a 50% butenylated polystyrene was 91.55% C and 8.45% H; found on duplicate runs was 91.55 and 91.65% C and 8.62 and 8.56% H.

The above results are consistent with the conclusion that approximately 50% of the styrene units in the polystyrene reacted with butadiene (presumably at the carbon adjacent to the benzene ring).

EXAMPLE II

The following run illustrates the butenylation of polystyrene at lower temperature than employed in Example I and a consequently higher percentage of alkenyl units in the product.

To a reactor containing polystyrene (150 grams), benzene (300 ml), sodium carbonate (42 grams), 22/78 sodium/potassium alloy (4.4 grams), and tetramethylethylenediamine (10 ml) maintained at 85° C. initially was added 1,3-butadiene liquid at 1 ml/minute. An exothermic reaction resulted in which the temperature increased to 130° C. After addition of 83 grams butadiene the reaction mixture was worked up as described in Example I. A cream colored solid product (176 grams) was obtained.

Elemental analysis on duplicate runs was 91.23 and 91.08% and 8.60 and 8.45% H. This was consistent with a product containing 70–80% butenyl units based on the number of styrene units in the polystyrene (calculated for 80% butenylation: 91.26% C and 8.74% H).

EXAMPLE III

The following run illustrates the bromination of the butenylated polystyrene obtained in Example II.

To a stirred reactor containing butenylated polystyrene (31.6 grams) from Example II in benzene (350 ml) maintained at 22°–26° C. with cooling as required was added dropwise a solution of bromine in benzene (32 grams bromine in 100 ml benzene). After addition of approximately 20 ml of bromine solution no further exotherm was observed and bromine color was no longer discharged in the reaction mixture. Approximately ½ of the remaining bromine solution was added and the mixture was stirred at room temperature for 30 minutes. After washing with aqueous sodium thiosulfate solution, the organic layer was dried over sodium sulfate, filtered and stripped to remove volatiles. The resulting residue was dissolved in methylene chloride and reprecipitated by adding slowly to stirred methanol. Drying under vacuum at 45° C. resulted in a light brown solid product (52 grams).

Infrared analysis of the product showed little absorption at $10.35\mu$ (olefinic unsaturation in butenylated polystyrene) and absorption at $14.6\mu$ characteristic of a C-Br bond. Elemental analysis of the brominated product showed approximately 28.5 weight % bromine.

The analytical results are consistent with a product in which bromine added across some of the olefinic unsaturation in the original butenylated polystyrene.

EXAMPLE IV

The following run illustrates the epoxidation of the butenylated polystyrene of Example II.

To a stirred reactor containing butenylated polystyrene (30 grams) from Example II and chloroform (30 ml) maintained at room temperature was added dropwise a solution of m-chloroperbenzoic acid (20 grams) in chloroform (250 ml). A slightly exothermic reaction was noted through approximately ¾ of the peracid addition. The initial bright yellow solution became pale yellow and turbid as a solid appeared. After an additional period of stirring 45 minutes at room temperature a 10% solution of sodium sulfite in water (25 ml) was added. The solution gave a negative peroxide test (KI/starch paper). After filtration the solution was washed with aqueous sodium bicarbonate and water prior to drying over sodium sulfate and magnesium sulfate. After flashing the volatiles the residual tacky solid was dissolved in methylene chloride and precipitated by adding to vigorously stirred hexane. The resulting precipitate was dried under vacuum at room temperature to give 20 grams of product.

Infrared analysis showed loss of the olefinic unsaturation absorption band ($10.35\mu$) and appearance of small absorption bands at 8.0 and $11.0\mu$. Carbon and hydrogen analysis of the product showed approximately 2.7% oxygen (by difference).

The above described analytical results are consistent with a product in which part of the olefinic unsaturation of the original butenylated polystyrene was epoxidized.

EXAMPLE V

The following run illustrates the oxidation of the butenylated polystyrene in Example II.

To a stirred reactor containing butenylated polystyrene of Example II (50 grams), benzene (250 grams) water (250 ml) and cetyltrimethylammonium bromide (2 grams) maintained at room temperature was added potassium permanganate (12 grams in 0.5–1 gram increments). A slightly exothermic reaction was noted as the permanganate color disappeared and a brown solid appeared. After stirring for three hours at room temperature the mixture was filtered through a filter pad. The organic layer was dried over magnesium sulfate and flashed to remove volatiles. The residual solid was dissolved in methylene chloride and reprecipitated by pouring the resulting solution into rapidly stirred methanol. The resulting precipitate was dried under vacuum at 45° C. to yield 10 grams of the product.

Infrared analysis showed a small absorption band corresponding to alcohol functionality. Carbon and hydrogen analysis of the product showed approximately 2% oxygen (by difference).

The above-described analytical results are consistent with a product containing hydroxy groups obtained by oxidation of the olefinic unsaturation in a butenylated polystyrene.

It will be evident to those skilled in the art that the invention can be practiced other than as specifically taught on consideration of the foregoing disclosure. Such variations and modifications are believed to be within the skill and the scope of the present invention as defined in the following claims.

What is claimed is:

1. A process for the alkenylation of monovinyl aromatic polymer comprising mixing a solution of a monovinyl aromatic polymer with an elemental alkali metal selected from the group consisting of sodium, potassium, lithium, and mixtures thereof in the presence of a polymerization inhibiting amount of a tertiary amine containing 3 to 10 carbon atoms per molecule under conditions suitable for producing a solution of alkali metal activated polymer and reacting the solution of alkali metal activated polymer with at least one conjugated diolefin under conditions such as to produce a monovinyl aromatic polymer containing a plurality of alkenyl branches along the polymer backbone, wherein the mixing of the monovinyl aromatic polymer and the alkali metal and the reaction of the alkali metal activated polymer with the conjugated diene are both conducted in the temperature range of about 25° C. to about 200° C., the elemental alkali metal is employed in an amount in the range of about 0.01 to about 10 parts by weight per 100 parts by weight of the monovinyl aromatic polymer, and the conjugated diene is employed in an amount of about 0.05 to about 1.0 mole per mole of monovinyl units in the polymer.

2. A process according to claim 1 wherein the conjugated diene is selected from conjugated diene hydrocarbons containing four to eight carbon atoms per molecule.

3. A process according to claim 2 wherein the tertiary amine is employed in an amount in the range of about 1 to about 10 parts by weight per 100 parts by weight of said monovinyl aromatic polymer.

4. A process according to claim 3 wherein the mixing of the monovinyl aromatic polymer and the alkali metal and the reaction of the alkali metal activated polymer with the conjugated diene are both conducted in the temperature range of about 70° C. to about 150° C.

5. A process according to claim 4 wherein said monovinyl aromatic polymer and said elemental alkali metal are mixed in the presence of at least one finely divided solid material selected from the group consisting of silica clays, diatomaceous earth, graphite, sodium carbonate, and sodium sulfate, and the finely divided solid material is employed in an amount in the range of about 2 to about 20 parts by weight per part by weight of the elemental alkali metal.

6. A process according to claim 4 wherein the monovinyl aromatic polymer is a molding grade polystyrene.

7. A process according to claim 4 wherein the solvent employed in preparing the solution of monovinyl aromatic polymer is selected from the group consisting of benzene, cyclohexane, and t-butylbenzene and the solvent is employed in an amount in the range of about 1 to about 20 parts by weight per part by weight of the monovinyl aromatic polymer.

8. A process according to claim 7 wherein the monovinyl aromatic polymer is a molding grade polystyrene.

9. A process according to claim 8 wherein said conjugated diene is 1,3-butadiene.

10. A process according to claim 9 wherein the elemental alkali metal is a sodium-potassium alloy, the solvent is benzene, the tertiary amine is tetramethylethylenediamine, and the finely divided solid material is sodium carbonate.

11. A process according to claim 10 wherein the weight ratio of sodium to potassium in said alloy is about 22 to about 78.

12. A process for modifying at least one property of a monovinyl aromatic polymer comprising alkenylating said polymer in accordance with claim 1, recovering the alkenylated polymer and subjecting the alkenyl groups of said polymer to an olefin addition reaction.

13. A process according to claim 12 wherein said olefin addition reaction is carried out in a solution of the alkenylated polymer.

14. A process according to claim 13 wherein the alkenylated polymer is butenylated polystyrene.

15. A process according to claim 14 wherein said butenylated polystyrene is reacted with bromine under conditions such that bromine addition occurs on butenyl branches of the butenylated polystyrene.

16. A process according to claim 14 wherein said butenylated polystyrene is reacted with m-chloroperbenzoic acid under conditions such that butenyl branches of the butenylated polystyrene are epoxidized.

17. A process according to claim 16 wherein said butenylated polystyrene is reacted with potassium permanganate under conditions such that butenyl branches of the butenylated polystyrene are oxidized.

18. A process according to claim 4 wherein said monovinyl aromatic polymer consists essentially of repeating units of coupled monovinyl aromatic molecules.

19. A process according to claim 1 wherein said monovinyl aromatic polymer consists essentially of repeating units of coupled monovinyl aromatic molecules.

* * * * *